(12) United States Patent
Lee et al.

(10) Patent No.: US 12,053,686 B2
(45) Date of Patent: Aug. 6, 2024

(54) SCREEN FOR SCREEN GOLF AND MANUFACTURING METHOD OF THE SAME

(71) Applicant: GOLFZON CO., LTD., Seoul (KR)

(72) Inventors: Jung Hun Lee, Sejong-si (KR); Jeong Min Son, Daejeon (KR)

(73) Assignee: GOLFZON CO., LTD., Seoul (KR)

( * ) Notice: Subject to any disclaimer, the term of this patent is extended or adjusted under 35 U.S.C. 154(b) by 142 days.

(21) Appl. No.: 17/922,784

(22) PCT Filed: May 6, 2021

(86) PCT No.: PCT/KR2021/005660
§ 371 (c)(1),
(2) Date: Nov. 1, 2022

(87) PCT Pub. No.: WO2021/225380
PCT Pub. Date: Nov. 11, 2021

(65) Prior Publication Data
US 2023/0166175 A1    Jun. 1, 2023

(30) Foreign Application Priority Data

May 8, 2020 (KR) .......................... 10-2020-0055147

(51) Int. Cl.
*G03B 21/60*   (2014.01)
*A63B 69/36*   (2006.01)
(Continued)

(52) U.S. Cl.
CPC ............ *A63B 71/0622* (2013.01); *C09D 1/00* (2013.01); *C09D 5/004* (2013.01); *D03D 1/00* (2013.01); *D03D 15/283* (2021.01); *D06M 11/83* (2013.01); *D06N 3/0006* (2013.01); *D06N 3/0077* (2013.01); *D06N 3/14* (2013.01); *G03B 21/60* (2013.01); *A63B 2102/32* (2015.10); *D06M 2101/32* (2013.01);
(Continued)

(58) Field of Classification Search
CPC ........................ G03B 21/56–625; A63B 69/36
See application file for complete search history.

(56) References Cited

U.S. PATENT DOCUMENTS 5,342,054 A * 8/1994 Chang ................ A63B 24/0021
434/252
2019/0324363 A1   10/2019 Ku et al.

FOREIGN PATENT DOCUMENTS

EP          0438161 A2 *  7/1991
JP          4446703 B2     4/2010
(Continued)

OTHER PUBLICATIONS

International Search Report for PCT/KR2021/005660 mailed Aug. 17, 2021 from Korean Intellectual Property Office.

*Primary Examiner* — Leon W Rhodes, Jr.
(74) *Attorney, Agent, or Firm* — Revolution IP, PLLC (57) ABSTRACT

The present invention may provide a screen used for screen golf, which can improve the brightness and clarity of the image projected on the screen by suppressing the light of the image from passing through the screen and increasing the reflectance of light from the front of the screen when an image is output by a projector on the screen. In addition, despite repeated golf shots of many users, the brightness and clarity of the image projected on the screen may not be damaged.

8 Claims, 4 Drawing Sheets

(51) Int. Cl.
  *A63B 71/06* (2006.01)
  *C09D 1/00* (2006.01)
  *C09D 5/33* (2006.01)
  *D03D 1/00* (2006.01)
  *D03D 15/283* (2021.01)
  *D06M 11/83* (2006.01)
  *D06N 3/00* (2006.01)
  *D06N 3/14* (2006.01)
  *A63B 102/32* (2015.01)
  *D06M 101/32* (2006.01)

(52) U.S. Cl.
  CPC ... *D06N 2201/02* (2013.01); *D06N 2203/068* (2013.01); *D06N 2209/0876* (2013.01); *D06N 2211/00* (2013.01); *D10B 2331/04* (2013.01)

(56) References Cited

FOREIGN PATENT DOCUMENTS

| | | | |
|---|---|---|---|
| JP | 2016-013639 A | | 1/2016 |
| KR | 20-2009-0009587 U | | 9/2009 |
| KR | 10-0972822 B1 | | 7/2010 |
| KR | 2010009854 U | * | 10/2010 |
| KR | 2010011659 U | * | 12/2010 |
| KR | 10-2013-0092198 A | | 8/2013 |
| KR | 2013-0125601 A | * | 11/2013 |
| KR | 10-1383920 B1 | | 4/2014 |
| KR | 10-2015-0061382 A | | 6/2015 |

* cited by examiner

SCREEN FOR SCREEN GOLF AND MANUFACTURING METHOD OF THE SAME

TECHNICAL FIELD

The present invention is, in screen golf that allows users to play virtual golf by sensing a result of a golf shot by a user and realizing a simulation with an image, related to a screen used to screen golf system provided in front of the user to take a golf shot and onto which a golf ball collides and an image for screen golf output from a projector is projected, and a manufacturing method of the same.

BACKGROUND ART

Recently, as the golf population has increased, a so-called screen golf system has emerged that allows users to practice golf and play a virtual round of golf using a virtual golf simulation device.

Such a screen golf system is constituted by installing a screen, a sensing device and a simulator in an indoor space. When the user hits the golf ball toward the screen while the image about the virtual golf course is displayed on the screen, the sensing device detects the movement of the golf ball, and a simulation of the movement of the golf ball is implemented in the virtual golf course image on the screen using data detected by the sensing device. Screen golf can provide users with a sense of realism, such as playing a golf round at a real golf course, beyond simply the level of a golf game enjoyed indoors. Therefore, apart from golfers who play golf rounds at real golf courses, the number of users who enjoy screen golf is increasing significantly.

Such a screen golf system provides a virtual reality image identical to that of a real golf course in order to provide the same reality as when a user actually plays a golf game on the golf course, and the image of the movement of the golf ball according to the hitting of the golf ball is also the same as the real one.

Accordingly, users can enjoy screen golf by taking a golf shot with a golf club while watching the view of the virtual golf course projected on the screen.

Conventionally, the screen used in the screen golf system as described above was mainly made of a fabric woven using a thread made of polyester. However, since the screen used to such a conventional screen golf penetrates a significant portion of the light of the image output from the projector to the screen, the reflectance of the light is low. Therefore, when the image output by the projector is projected onto the conventional screen, there is a problem that the overall brightness of the image displayed through the screen is lowered and the image projected on the screen is not clear.

As a prior art to solve the above problems, for example, Korean Utility Model Publication No. 20-2009-0009587 discloses that a thick fabric is treated with a basic coating using silica, methanol, and a brown agent, so that the bright color and sharpness of the image are improved.

However, Publication No. 20-2009-0009587 has the following problems. In screen golf, when a user hits a golf ball with a golf club, the hit golf ball is launched at a fairly high speed and collides with the screen very strongly. In addition, since the strong collision of the golf ball against the screen as described above is repeatedly made by many users, the impact of the collision of the golf ball is cumulative. Even since intensive collisions occur on a specific area of the screen, the coating layer such as silica formed on the front surface of the screen is inevitably worn or destroyed very quickly, and accordingly, the effect of improving the color and clarity of image projected on the screen by the coating quickly disappears.

As another prior art Japanese Patent Publication No. 4446703 has been disclosed. JP4446703 discloses a technology for increasing the light reflectance of a screen by forming a film layer containing a polyolefin-based resin on the screen. However, the technology disclosed in the above Japanese Patent Publication also has a problem in that a strong impact force is transmitted to the screen by repeated golf shots of many users, and the effect is accumulated considerably and the film layer is rapidly annihilated or destroyed.

As another prior art Korean Patent Publication No. 10-2013-0092198 discloses a technology of embossing to achieve diffuse reflection on the surface of the screen receiving light when the projector outputs an image to the screen. However, the technology disclosed in KR10-2013-0092198 also has a problem in that the embossing is rapidly damaged due to the accumulation of effects due to the strong impact and repeated impact of the golf ball delivered to the screen.

DISCLOSURE

Technical Problem

It is an object of the present invention to provide a screen used for screen golf, which can improve the brightness and clarity of the image projected on the screen by suppressing the light of the image from passing through the screen and increasing the reflectance of light from the front of the screen when an image is output by a projector on the screen. In addition, despite repeated golf shots of many users, the brightness and clarity of the image projected on the screen may not be damaged.

Technical Solution

In accordance with an aspect of the present invention, the above and other objects can be accomplished by the provision of a screen for screen golf provided at a predetermined distance away from a projector that outputs an image for screen golf and the image output by the projector is projected on the screen, comprising: a screen front part woven by yarns, on which a golf ball hit by the user collides and the image output by the projector is projected; and a rear coating part formed on a rear surface of the screen front part by coated with an elastic polymer compound to increase light reflectivity by blocking the light of the image output from the projector and to have elasticity to buffer the impact of the golf ball on the screen front part.

In the screen for screen golf according to an embodiment of the present invention, the screen front part is manufactured by a screen fabric woven by mixing polyester thread and yarn containing titanium dioxide (TiO2) in polyester.

In the screen for screen golf according to an embodiment of the present invention, the screen front part is manufactured by pressing both sides of the screen fabric with a preset pressure using a hot press heated to a preset temperature to process a surface planarization of the screen fabric.

In the screen for screen golf according to an embodiment of the present invention, the screen front part is manufactured by pressing both sides of a screen fabric woven by yarns containing titanium dioxide (TiO2) in polyester with a preset pressure using a hot press heated to a preset temperature to process a surface planarization of the screen fabric.

In the screen for screen golf according to an embodiment of the present invention, the rear coating part is formed by applying the elastic polymer compound in a liquid state to the rear surface of the screen front part and then pressing and solidifying.

In the screen for screen golf according to an embodiment of the present invention, the rear coating part is formed by forming a reflective thin film layer made of a material containing metal or ceramic on the rear surface of the screen front part, and coating the reflective thin film layer with the elastic polymer compound.

In accordance with another aspect of the present invention, there is provided a manufacturing method of a screen for screen golf according to an embodiment of the present invention is provided at a predetermined distance away from a projector that outputs an image for screen golf, and the image output by the projector is projected on the screen, comprising: manufacturing a screen front part on which a golf ball hit by the user collides and the image output by the projector is projected, using a screen fabric woven with a mixture of polyester thread and yarn containing titanium dioxide (TiO2) in polyester, or woven with the yarns containing titanium dioxide (TiO2) in polyester; and forming a rear coating part on a rear surface of the screen front part by coated with an elastic polymer compound to increase light reflectivity by blocking the light of the image output from the projector and to have elasticity to buffer the impact of the golf ball on the screen front part.

In the manufacturing method of the screen for screen golf according to an embodiment of the present invention, manufacturing the screen front part includes processing a surface planarization of the screen fabric by pressing both sides of the screen fabric with a preset pressure using a hot press heated to a preset temperature.

Advantageous Effects

The screen used for screen golf according to an embodiment of the present invention has an effect in that the screen can improve the brightness and clarity of the image projected on the screen by suppressing the light of the image from passing through the screen and increasing the reflectance of light from the front of the screen when an image is output by a projector on the screen. In addition, despite repeated golf shots of many users, the brightness and clarity of the image projected on the screen may not be damaged.

BEST MODE

The screen for screen golf and the manufacturing method for the same according to an embodiment of the present invention will be described in detail with reference to the drawings.

Figure 1:
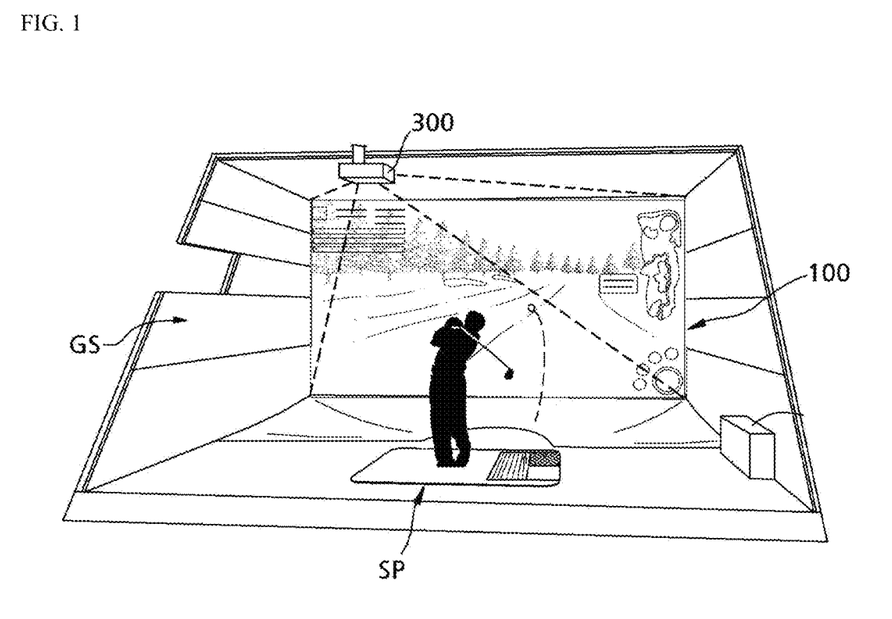
FIG. 1 shows a screen golf system equipped with the screen for screen golf according to an embodiment of the present invention.
Figure 2:
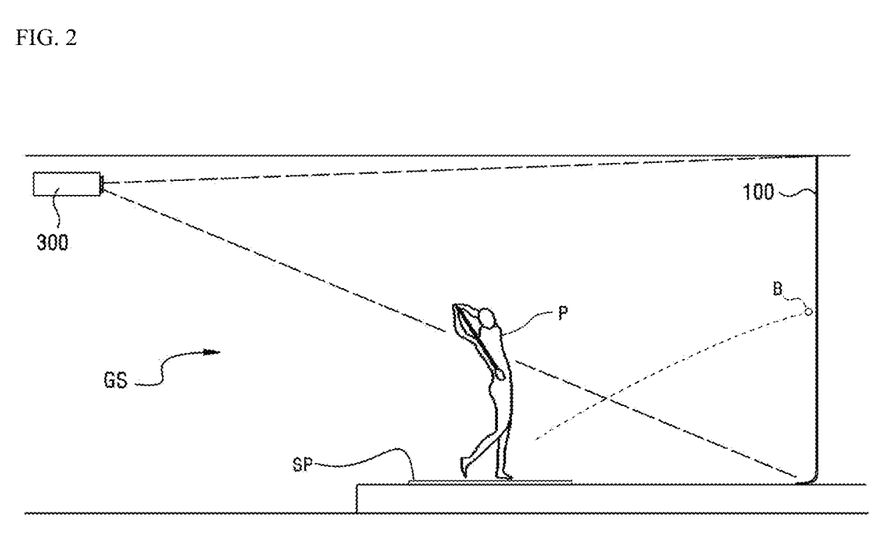
FIG. 2 shows a side in which an image output by an image output projector in the screen golf system shown in FIG. 1 is projected on a screen according to an embodiment of the present invention.

FIG. 1 shows a screen golf system equipped with the screen for screen golf according to an embodiment of the present invention, and FIG. 2 shows a side in which an image output by an image output projector in the screen golf system shown in FIG. 1 is projected on a screen according to an embodiment of the present invention.

As shown in FIGS. 1 and 2, the screen golf system may be installed in a predetermined space GS in which a swing zone SP is provided so that the user P can take a golf swing on the swing zone SP. That is, in the space GS, the screen 100 for screen golf according to an embodiment of the present invention may be provided in front of the swing zone SP where the user P hits the golf ball B in the space GS. In addition, a projector 300 that outputs an image for screen golf and projects it on the screen 100 may be provided at a location separated from the screen 100 by a predetermined distance.

Through the screen golf system, a user or a plurality of users hit a golf ball with a golf club from the swing zone SP toward the screen 100 in order, and the sensing device senses the hit golf ball B, and using the sensing result of the sensing device, a virtual golf game or virtual golf practice is performed while projecting and showing an image in which a virtual ball corresponding to the hit golf ball is simulated in a virtual golf course on the screen 100.

The screen 100 for screen golf according to an embodiment of the present invention, as shown in FIGS. 1 and 2, the image output by the projector 300 is projected and shown to the user(s) and the golf ball B fired according to the users' golf shot strongly collides.

Therefore, the screen 100 for screen golf basically requires a number of users to have good durability and buffering ability against the collision as golf balls hit by golf shots are cumulatively collided, and at the same time, it should be possible to provide a bright and clear image to users by projecting the image output by the projector 300.

The screen for screen golf according to an embodiment of the present invention has the effect of improving the brightness and sharpness of the image projected by the projector 300 while being able to buffer even when the golf ball is hit strongly as described above.

Figure 3:
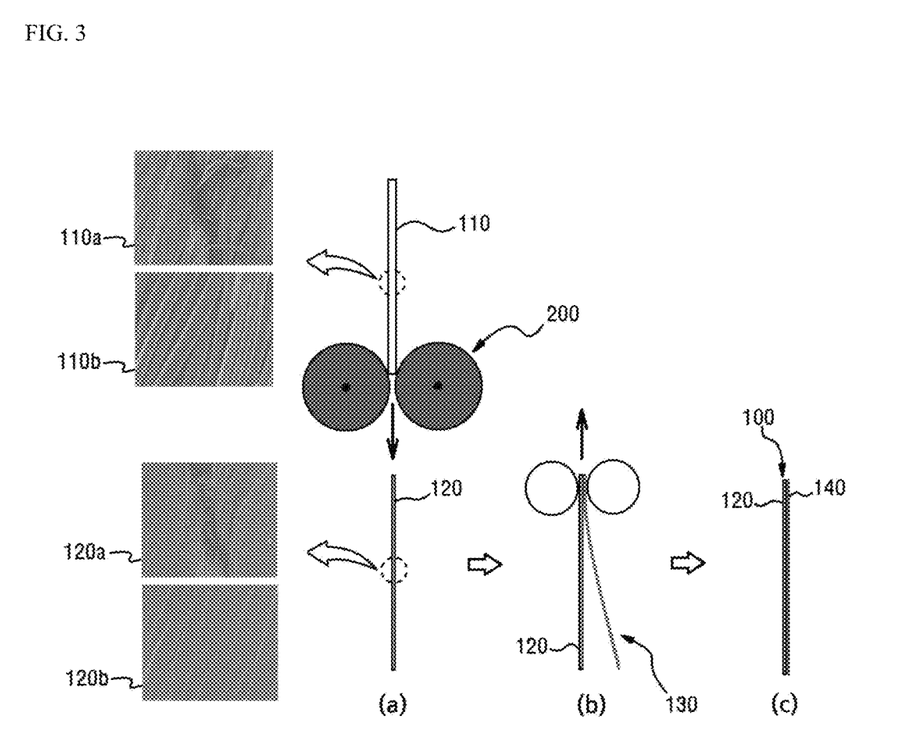
FIG. 3 shows a process for manufacturing the screen for screen golf according to an embodiment of the present invention.

For this purpose, a process for manufacturing the screen for screen golf according to an embodiment of the present invention is shown in FIG. 3.

As shown in (c) of FIG. 3, the screen for screen golf according to an embodiment of the present invention includes, a screen front part 120 on which an image output by the projector is projected on the front surface of the screen woven by a thread. In addition, the screen includes a rear coating part 140 which s formed by coating the rear surface of the screen front part 120 with an elastic polymer compound, wherein the elastic polymer compound of the rear coating part gives elasticity to alleviate the impact caused by the 5 collision of the golf ball on the front surface of the screen front part 120, and blocks the transmission of the light of the image output by the projector to the screen front part 120 to increase the reflectance of light in the image.

Conventional screens for screen golf are made by dyeing a flame retardant on a polyester fabric made by weaving a thread made of polyester. However, such a screen made of polyester fabric according to conventional method has problems that since the screen made of polyester material transmits a significant portion of the light of the image output by the projector, the image projected on the screen is not bright and the clarity is lowered and the screen is frequently damaged according to the accumulated collisions of the golf balls by the golf shots.

The screen front part 120 of the screen for screen golf according to an embodiment of the present invention is manufactured using a screen fabric 110 woven by mixing a polyester thread and a yarn containing titanium dioxide (TiO2) in polyester, wherein the yarn containing titanium dioxide (TiO2) in polyester may be made by dyeing a polyester thread with titanium dioxide (TiO2).

The yarn containing titanium dioxide (TiO2) in polyester may contain 0.1 to 10 wt %, more preferably 1 to 3 wt %, of titanium dioxide (TiO2) in polyester. The mixing ratio of the yarn containing titanium dioxide (TiO2) in polyester and polyester thread may be 1:9 to 5:5, or the ratio of the yarn containing titanium dioxide (TiO2) in polyester in the screen fabric may be 50% or more.

As described above, the screen front part 120 of the screen for screen golf according to an embodiment of the present invention is the screen made using the screen fabric 110 woven by mixing a polyester thread and a yarn containing titanium dioxide (TiO2) in polyester.

The screen front part 120 can be made by planarization of the surface of the screen fabric 110 as described above by a compression processing in which both sides the screen fabric 110 are pressed with a hot press 200 as shown in (*a*) of FIG. 3.

In FIG. 3 (*a*), the screen fabric 110 before the compression processing by the hot press 200 and the screen front part 120 manufactured by compressing the screen fabric 110 by the hot press 200 are shown.

The surface planarization of the screen fabric may be processed as the hot press 200 compresses both sides of the screen fabric 110 using a roller heated to a temperature set in the range of 100~300° C., preferably 150~200° C. and with a pressure set in the range of 1~10 kg/cm$^2$, preferably 2~5 kg/cm$^2$. FIG. 3 shows the fiber states 110*a* and 110*b* of the screen fabric 110 before the surface planarization is processed, and the fiber states 120*a* and 120*b* of the screen front part 120 after the surface planarization is processed.

In FIG. 3, a picture 110*a* magnified at a magnification of 150 times and a picture 110*b* magnified at a magnification of 500 times with respect to the screen fabric 110 before the surface planarization processing are shown.

As shown in the enlarged magnification pictures 110*a* and 110*b*, since the surface of the screen fabric 110 before the surface planarization processing is uneven and rough, the light of the image of the projector is partially diffusely reflected, and thus the clarity of the projected image may be reduced.

On the other hand, in FIG. 3, a picture 120*a* magnified at a magnification of 150 times and a picture 120*b* magnified at a magnification of 500 times with respect to the screen front part 120 after the surface planarization process by the hot press 200 are shown.

As shown in the enlarged magnification pictures 120*a* and 120*b*, since the fibers are compressed by the surface planarization and spread to the periphery, filling the empty space and making the surface even, the screen front part 120 after the surface planarization process can constantly reflect the light from the projector, so that the sharpness of the image can be further improved.

The surface planarization process by the hot press 200 as described above may be performed one or more times.

In addition, since the screen front part 120 according to the surface planarization process by the hot press 200 as described above reduces frictions at the surface of the screen front part, it is possible to prevent a phenomenon in which the fibers on the surface of the screen front part 120 diffuse light and reduce the sharpness due to frictions with the golf ball according to the collision of the golf ball.

As described above, the screen fabric can be manufactured by weaving a mixture of polyester thread and yarn containing 0.1 to 10 wt % of titanium dioxide in a polyester in a predetermined ratio, and the screen front part 120 can be made by the surface planarization process of the manufactured screen fabric by hot pressing. Here one of the reasons for mixing the polyester thread and the yarn containing titanium dioxide and weaving the screen fabric using the mixture is to prevent the brightness of the image projected on the front of the screen from being lowered as titanium dioxide is peeled off and damaged from the yarn containing titanium dioxide by collisions with golf balls.

However, in the weaving of the screen fabric, even if the content ratio of the yarn containing titanium dioxide is increased, if the surface planarization process by the hot press is processed one or more times, even when the golf ball strongly collides so that a large impact is applied to the screen front part, the titanium dioxide peeling phenomenon can be prevented.

When the surface planarization by the hot press is processed one or more times, the above-described titanium dioxide is prevented from peeling off even if the screen fabric is manufactured only by the yarn containing titanium dioxide without being mixed with the polyester thread. Therefore, even if the screen fabric is woven with only the yarn containing titanium dioxide, if the surface planarization process using the hot press is processed after that, the effect of greatly improving the brightness of the projected image according to the present invention can be obtained.

Meanwhile, according to the surface planarization process using the hot press with respect to the screen fabric woven by mixing the polyester thread and the yarn containing titanium dioxide (TiO2) in polyester thread in a predetermined ratio or with respect to the screen fabric woven only with the yarn containing titanium dioxide (TiO2) in polyester thread, the screen front part 120 is generated, and as shown in (*b*) of FIG. 3, by applying the elastic polymer compound 130 in a liquid state to the rear surface of the screen front part 120, compressing the screen front part with the liquid state elastic polymer compound under a predetermined pressure and solidifying, a rear coating part 140 may be formed on the rear surface of the screen front part 120 as shown in (*c*) of FIG. 3.

As shown in (*b*) of FIG. 3, the liquid elastic polymer compound 130 on the rear surface of the screen front part 120 of the screen may be applied to a thickness of 0.1~3 mm and at a speed of 10~50 m/hour, be compressed under a temperature of 100~300° C., preferably 150~200° C. and at a pressure of 1~10 kg/cm$^2$, preferably 2~5 kg/cm$^2$, and by solidifying, the rear coating part 140 may be formed.

As the elastic polymer compound, various compounds may be used. For example, synthetic rubber having excellent elasticity may be used, and a compound such as polyurethane may be used.

As the rear coating part 140 is formed using the elastic polymer compound as described above, the rear coating part 140 of the elastic polymer compound may block light from transmitting through the screen front part 120 when the image light from the projector is projected on the front of the screen front part 120, and by increasing the light reflectance of the screen, the overall brightness of the image projected on the screen may be improved.

Figure 4:
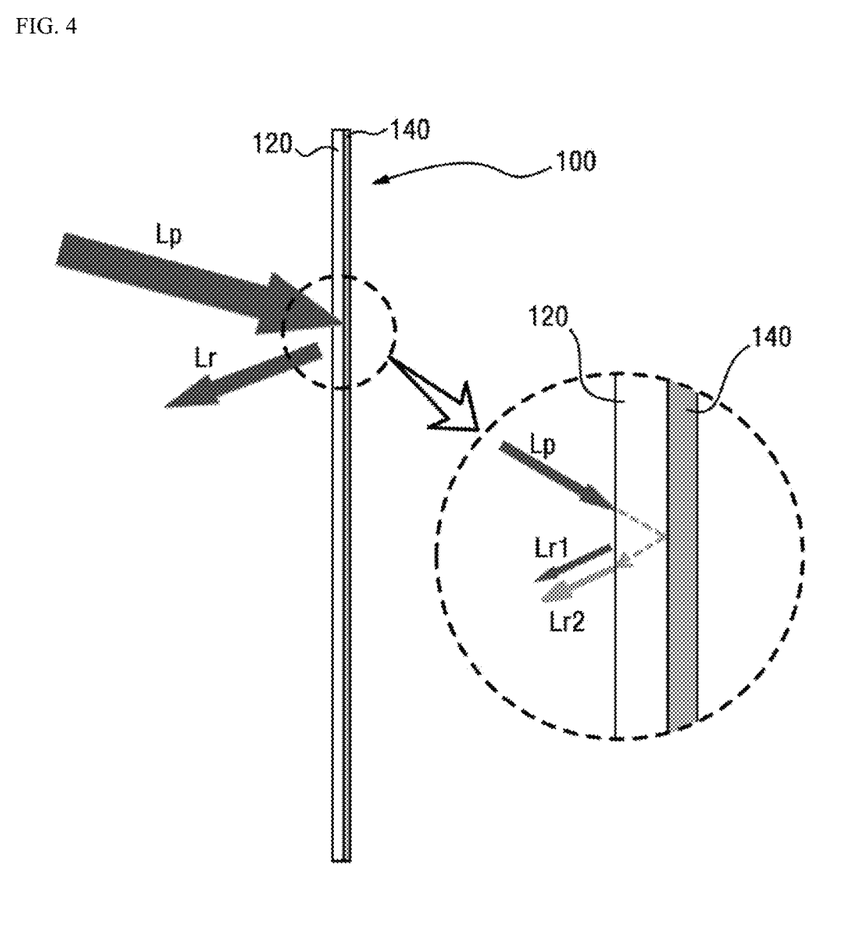
FIG. 4 shows mechanism of the improvement of the light reflectivity of the screen 100 for screen golf according to an embodiment of the present invention.

FIG. 4 shows mechanism of the improvement of the light reflectivity of the screen 100 for screen golf according to an embodiment of the present invention.

As shown in FIG. 4, when the light Lp of the image output from the projector is projected to the front of the screen front part 120 of the screen 100 for screen golf according to an embodiment of the present invention, the overall brightness of the projected image may be improved since the reflectance of the light on the screen is high.

The screen for screen golf according to an embodiment of the present invention may reflect the light entering the front of the screen front part 120 by first reflection and second reflection.

The case in which light is directly reflected from the front surface of the screen front part is referred to as the 'first reflection', and the case in which light is reflected by the rear coating part 140 after passing through the screen front part is referred to as the 'second reflection'.

It is possible to increase the overall light reflectance of the screen since the screen for screen golf according to an embodiment of the present invention can increase the amount of reflection of light according to the first reflection from the front of the screen front part 120, and increase the amount of reflection of light according to the second reflection by blocking the light passing through the screen front part by the rear coating part 140.

As described above, the screen front part 120 of the screen according to an embodiment of the present invention can increase the reflectance of the above-described first reflection by manufacturing using a screen fabric woven by mixing the yarn containing titanium dioxide (TiO2) or a screen fabric woven only with the yarn containing titanium dioxide (TiO2), and can improve the clarity of the projected image by processing the surface planarization of the above-described screen fabric using the hot press.

And, by coating an elastic polymer compound on the rear surface of the screen front part to form the rear coating part, the rear coating part blocks a portion of light penetrated from the image projected on the screen front part, thereby increasing the reflectivity according to the second reflection.

In addition, it is possible to improve the buffering performance as the golf ball collides with the screen front part by the elasticity of the rear coating part coated on the rear surface of the screen front part.

Meanwhile, although not shown in the figures, after forming a reflective thin film layer of a material containing metal or ceramic on the rear surface of the screen front part of the screen for screen golf according to an embodiment of the present invention, the above-described rear coating part may be formed on the reflective thin film layer.

In this way, by forming the reflective thin film layer of the material containing metal or ceramic on the rear surface of the screen front part and forming the rear coating part of an elastic polymer compound thereon, when a portion of the light entering on the front surface of the screen is transmitted, since the reflectance in the reflective thin film layer is increased and the reflection is also made in the rear coating part, the reflectance according to the second reflection can be further improved.

As described above, the screen for screen golf according to an embodiment of the present invention has an advantageous effect in that the screen can improve the reflectivity in the screen front part, increase the sharpness of the image projected on the screen, increase the reflectivity according to the second reflection by blocking light passing through the screen front part to improve the overall brightness of the image projected on the screen, and improve the buffering performance according to the collision of the golf ball by the elasticity of the rear coating part.

INDUSTRIAL APPLICABILITY

The screen for screen golf according to the present invention and the manufacturing method of the same can be used in industrial fields related to golf practice and so-called screen golf industry fields that enable golf play based on virtual golf simulation.

The invention claimed is:

1. A screen for screen golf that is provided at a predetermined distance away from a projector that outputs an image for screen golf, and on which the image output by the projector is projected, the screen comprising:
   a screen front part woven by yarns, on which a golf ball hit by the user collides and the image output by the projector is projected; and
   a rear coating part formed on a rear surface of the screen front part by coated with an elastic polymer compound to increase light reflectivity by blocking the light of the image output from the projector and to have elasticity to buffer the impact of the golf ball on the screen front part.

2. The screen for screen golf according to claim 1, wherein the screen front part is manufactured by a screen fabric woven by mixing polyester thread and yarn containing titanium dioxide (TiO2) in polyester.

3. The screen for screen golf according to claim 2, wherein the screen front part is manufactured by pressing both sides of the screen fabric with a preset pressure using a hot press heated to a preset temperature to process a surface planarization of the screen fabric.

4. The screen for screen golf according to claim 1, wherein the screen front part is manufactured by pressing both sides of a screen fabric woven by yarns containing titanium dioxide (TiO2) in polyester with a preset pressure using a hot press heated to a preset temperature to process a surface planarization of the screen fabric.

5. The screen for screen golf according to claim 1, wherein the rear coating part is formed by applying the elastic polymer compound in a liquid state to the rear surface of the screen front part and then pressing and solidifying.

6. The screen for screen golf according to claim 1, wherein the rear coating part is formed by forming a reflective thin film layer made of a material containing metal or ceramic on the rear surface of the screen front part, and coating the reflective thin film layer with the elastic polymer compound.

7. A manufacturing method of a screen for screen golf that is provided at a predetermined distance away from a projector that outputs an image for screen golf and on which the image output by the projector is projected, the method comprising:
   manufacturing a screen front part on which a golf ball hit by the user collides and the image output by the projector is projected, using a screen fabric woven with a mixture of polyester thread and yarn containing titanium dioxide (TiO2) in polyester, or woven with the yarns containing titanium dioxide (TiO2) in polyester; and
   forming a rear coating part on a rear surface of the screen front part by coated with an elastic polymer compound to increase light reflectivity by blocking the light of the image output from the projector and to have elasticity to buffer the impact of the golf ball on the screen front part.

8. The manufacturing method of the screen according to claim 7, wherein manufacturing the screen front part includes processing a surface planarization of the screen fabric by pressing both sides of the screen fabric with a preset pressure using a hot press heated to a preset temperature.

* * * * *